US006462144B1

(12) United States Patent
Ramesh et al.

(10) Patent No.: US 6,462,144 B1
(45) Date of Patent: Oct. 8, 2002

(54) CARBAMATE-FUNCTIONAL RESINS AND THEIR USE IN HIGH SOLIDS COATING COMPOSITIONS

(75) Inventors: Swaminathan Ramesh, Canton; Marvin L. Green, Brighton; Donald H. Campbell, Hartland; Walter H. Ohrbom, Hartland Township, all of MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/793,289

(22) Filed: Feb. 26, 2001

Related U.S. Application Data

(63) Continuation-in-part of application No. 09/748,643, filed on Dec. 22, 2000, now abandoned.

(51) Int. Cl.[7] ................................................ C08G 18/32

(52) U.S. Cl. ....................... 525/438; 525/450; 525/440; 525/460; 525/445; 528/69; 528/85; 428/413; 428/423.1

(58) Field of Search ................................ 525/450, 438, 525/440, 460, 445; 428/423.1, 413; 528/69, 85

(56) References Cited

U.S. PATENT DOCUMENTS 5,665,433 * 9/1997 Moussa et al. ............. 427/377

* cited by examiner

*Primary Examiner*—James J. Seidleck
*Assistant Examiner*—Melanie Bissett
(74) *Attorney, Agent, or Firm*—Mark A. Frentrup

(57) ABSTRACT

The present invention provides a coating composition containing 1) a carbamate-functional resin having in its structure a hyperbranched or star polyol core, a first chain extension based on a polycarboxylic acid or anbydride, a second chain extension based on an epoxy containing compound, and having carbamate functional groups on the core, the second chain extension, or both; and 2) a second resin containing functional groups reactive with the carbamate groups on the carbamate-functional resin. In one embodiment, the coating compositions are used as a cloarcoat to be applied over a basecoat to form a composite coating. The compositions exhibit a combination of desirable properties, such as scratch and mar resistance, resistance to environmental etch, good intercoat adhesion, and high solids.

49 Claims, No Drawings

CARBAMATE-FUNCTIONAL RESINS AND THEIR USE IN HIGH SOLIDS COATING COMPOSITIONS

This application is a continuation-in-part of application Ser. No. 09/748,643 filed on Dec. 22, 2000, now abandoned.

FIELD OF THE INVENTION

The present invention relates to carbamate-functional resins and their use in high solids coating compositions. More specifically it relates to carbamate functionalized star or hyperbranched polyols as reactive resins in coatings.

BACKGROUND OF THE INVENTION

Coating compositions based on carbamate-functional acrylic polymers and aminoplast cross-linking agents are desirable as automotive topcoats because they have excellent durability, hardness, gloss, appearance, and resistance to environmental etch. As such, they are highly suitable for use as a clearcoat layer applied over a basecoat layer in a color plus clear composite coating.

A problem associated with curable coating compositions based on acrylic polymers containing pendant carbamate groups and aminoplast curing agents is that the compositions do not have particularly good intercoat adhesion. This problem presents itself when the compositions are used as clearcoats and composite color plus clear coatings, especially during repair procedures which involve applying the clear film forming composition to a flawed area of a previously applied color plus clear composite coating.

Another area for improvement in the use of carbamate-functional acrylic polymers with amino resins systems as cross-linkers is compatibility with waterborne basecoats. The waterborne basecoats contain amines used to salt the resin into water. During baking, the amine is released from the basecoat and travels through the clearcoat to the surface, where it is released into the atmosphere. The concentration of amine at the bottom of the clearcoat is greater than the concentration at the top, which sets up a pH gradient in the clearcoat. Because the cure rate is a function of the pH, a so called cure gradient forms in the clearcoat. This leads to an appearance defect known as wrinkling.

The curable carbamate-functional compositions are generally formulated with a low-imino amino resin so as to achieve high solids, which is desirable for economic and environmental reasons. If instead high-imino amino resins are used, the cure gradient is minimized along with the wrinkling. This is because the dependency on pH of the cure rate of a high-imino amino resin is not as great as that of a low-imino resin.

However, when high-imino resins are used, the solids content of the coating becomes unacceptably low. Thus, it would be desirable to provide a coating composition based on carbamate-functional resins and amino resin crosslinkers that have a combination of high solids and compatibility with waterborne basecoats. Preferably, such a composition would also exhibit improved intercoat adhesion.

U.S. Pat. No. 5,759,694 to Mayo has addressed the intercoat adhesion problem by providing a polyester made by copolymerizing a diol, optional triol, a hydroxyl functional and acidic functional material, and a polyacid, followed by reaction with a monoepoxide and carbamoylation. The polyester is combined with a carbamate-functional acrylic resin and an aminoplast to yield a film forming composition. Mayo does not directly address the problem of compatibility of the film forming composition with a waterborne basecoat.

U.S. Pat. No. 5,693,723 to Green describes a carbamate-functional resin prepared by reacting a compound having at least one hydroxyl group and one carboxyl group with an epoxy compound, and then carbamoylating the reaction product. High solids coating compositions are obtained, but there is no discussion of how to improve intercoat adhesion.

SUMMARY OF THE INVENTION

The present invention provides a coating composition containing 1) a carbamate-functional resin having in its structure a hyperbranched or star polyol core, a first chain extension based on a polycarboxylic acid or anhydride, a second chain extension based on an epoxy-containing compound, and having carbamate functional groups on the core, the second chain extension, or both; and
2) a second resin containing functional groups reactive with the carbamate groups on the carbamate-functional resin.

In one embodiment, the coating compositions are used as clearcoats applied over basecoats to form composite coatings. The compositions exhibit a combination of desirable properties, such as scratch and mar resistance, resistance to environmental etch, good intercoat adhesion, and high solids.

In another embodiment, the coating compositions also contain a carbamate-functional acrylic resin. In this embodiment, the carbamate-functional resin of the invention may act as a reactive diluent. Methods are also provided to synthesize the carbamate-functional resins of the invention.

DETAILED DESCRIPTION OF THE INVENTION

The terms "carbamate group", "carbamate-functional", and the like, as used in connection with the present invention refer to a group having a structure:

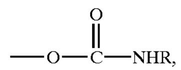

in which R is H or alkyl, preferably R is H or alkyl of from 1 to about 8 carbon atoms, more preferably R is H or alkyl of from 1 to about 4 carbon atoms, and yet more preferably R is H. When R is H, the carbamate group is referred to herein as a primary carbamate group.

The carbamate-functional resin of the invention is based on a star or hyperbranched core and contains carbamate functionality. The carbamate functionality can be introduced onto the core by reacting the core with a compound containing a carbamate group and a functional group reactive with the hydroxyl groups on the core. Alternatively, it can be introduced by a series of extension steps with a polycarboxylic acid or anhydride and epoxy compound, followed by carbamoylation. The degree of carbamoylation and the number of extensions can be selected so as to obtain desirable properties of coatings prepared from the resin.

The carbamate-functional resins of the invention can be formulated with another resin having functional groups reactive with the carbamate groups to form curable coating compositions particularly useful as a topcoat or as a clearcoat component of a basecoat-clearcoat composite coating. The coating compositions of the invention can further contain a carbamate-functional acrylic resin.

The star core is a structure based on a star polyol. A star polyol is a monomeric polyol containing three or more primary or secondary hydroxyl groups. In a preferred embodiment, the star polyol has four or more hydroxyl groups. Examples of star polyols include, without limitation, glycerol, trimethylolpropane, trimethylolethane, pentaerythritol, ditrimethylolpropane, dipentaerythritol, tetrakis (2-hydroxyethyl)methane, diglycerol, trimethylolethane, xylitol, glucitol, dulcitol, and sucrose. Mixtures of star polyols may also form the star core of the carbamate-functional resin of the invention.

A hyperbranched core is a structure based on hyperbranched polyols. Hyperbranched polyols are prepared by the reaction of a first compound having two or more hydroxyl groups and a second compound having one carboxyl group and two or more hydroxyl groups. The first and second compounds can be reacted to form a first generation hyperbranched polyol. Alternatively, the second compound can be reacted with the first generation hyperbranched polyol to form a second generation and, if desired, subsequent generations. Preferably, a first generation or second generation hyperbranched polyol is used as the hyperbranched core of the carbamate-functional resin of the invention.

The first compound can suitably be an aliphatic, a cycloaliphatic, or an aromatic diol, triol, or tetrol, a sugar alcohol such as sorbitol and mannitol, dipentaerythritol, an α-alkylglucoside such as α-methylglucoside, or an alkoxylate polymer having a molecular weight of at most about 8,000 that is produced by a reaction between an alkylene oxide or a derivative thereof and one or more hydroxyl groups from any of the alcohols mentioned above. Mixtures of these can also be used as the first compound.

Diols suitable as the first compound include straight diols with 2–18 carbon atoms. Examples include, without limitation, 1,3-propanediol, 1,2-ethanediol, 1,4-butanediol, 1,5-pentanediol, and 1,6-hexanediol.

The diols can also be branched such as, for instance, dimethylolpropane, neopentyl glycol, 2-propyl-2-methyl-1,3-propanediol, 2-butyl-2-ethyl-1,3-propanediol, 2,2-diethyl-1,3-propanediol, 2,2,4-trimethylpentane-1,3-diol, trimethylhexane-1,6-diol, and 2-methyl-1,3-propanediol. Other suitable diols include, without limitation, diethylene glycol, triethylene glycol, polyethylene glycols, dipropylene glycol, tripropylene glycol and polypropylene glycols.

Cycloaliphatic diols such as cyclohexane dimethanol and cyclic formals of pentaerythritol such as, for instance, 1,3-dioxane-5,5-dimethanol can also be used.

Aromatic diols, for instance 1,4-xylylene glycol and 1-phenyl-1,2-ethanediol, as well as reaction products of polyfunctional phenolic compounds and alyklene oxides or derivatives thereof, can furthermore be employed. Bisphenol A, hydroquinone, and resorcinol may also be used.

Diols of the ester type, for example neopentylhydroxypivalate, are also suitable diols.

As substitute for a 1,2-diol, the corresponding 1,2-epoxide or an α-olefin oxide can be used. Ethylene oxide, proplyene oxide, 1,2-butylene oxide, and styrene oxide can serve as examples of such compounds.

Suitable triols can contain three primary hydroxyl groups. Trimethylolpropane, trimethylolethane, trimethylobutane, and 3,5,5-trimethyl-2,2-dihydroxymethylhexane-1-ol are examples of this type of triols. Other suitable triols are those having two types of hydroxyl groups, primary as well as secondary hydroxyl groups, as for instance glycerol and 1,2,6-hexanetriol. It is also possible to use cycloaliphatic and aromatic triols and/or corresponding adducts with alkylene oxides or derivatives thereof.

Suitable tetrols for use as the first compound include, without limitation, pentaerythritol, ditrimethylolpropane, diglycerol and ditrimethylolethane. It is also possible to use cycloaliphatic and aromatic tetrols as well as corresponding adducts with alkylene oxides or derivatives thereof.

The second compound used to prepare the hyperbranched polyol can be a monofunctional carboxylic acid having at least two hydroxyl groups. Examples include, without limitation α,α-bis(hydroxymethyl)propionic acid (dimethylol propionic acid), α,α-bis(hydroxymethyl)butyric acid, α,α,α-tris(hydroxymethyl)acetic acid, α,α-bis(hydroxymethyl) valeric acid, α,α-bis(hydroxyethyl)propionic acid or α-phenylcarboxylic acids having at least two hydroxyl groups directly pendant to the phenyl ring (phenolic hydroxyl groups) such as 3,5-dihydroxybenzoic acid.

The hyperbranched polyols can be prepared by reacting the first compound and second compound under esterification conditions. The temperature of reaction is generally from 0 to 300° C., preferably 50 to 280° C., and most preferably 100 to 250° C.

A first generation intermediate is prepared by reacting the first compound and second compound in an equivalent molar ratio of hydroxyls on the first compound to carboxyl groups on the second compound of between about 1:2 and about 2:1. Preferably the equivalent ratio will be from about 1:1.5 to about 1.5: 1, and even more preferably from about 1:1.2 to about 1.2:1.

The functionality and polydispersity of the first generation intermediate, and of any subsequent generation, depend on the equivalent ratio of hydroxyl groups to carboxyl groups of the reactants in each step. The functionality of the hyperbranched polyol, whether first generation or subsequent generation, should be four hydroxyl groups or greater. Hyperbranched polyols with a wide range of polydispersities are useful. It is preferred that the polydispersity be less than about 2.5, preferably less than about 2.0, and most preferably less than about 1.8.

To make the resins of the invention, the core polyol, either star or hyperbranched as described above, is next reacted with a polycarboxylic acid or anhydride to form a first chain extension containing an ester linkage and a free carboxyl group. Preferred as the polycarboxylic acid or anhydride are cyclic carboxylic anhydrides. Anhydrides are advantageous for this step because the ring-opening esterification is faster than reaction of remaining hydroxyl groups on the core polyol with the carboxyl group liberated by the ring opening reaction. As a consequence the first chain extension is a half acid ester with little polymerization or polyester formation.

Suitable anhydrides include, without limitation, anhydrides of dicarboxylic acids with carboxyl groups on adjacent carbons. The anhydrides can be aliphatic, cycloaliphatic, or aromatic. Examples include without limitation, maleic anhydride, succinic anhydride, phthlalic anhydride, hexahydrophthalic anhydride, tetrahydrophthalic anhydride, methyl tetrahydrophthalic anhydride, methylhexahydrophthalic anhydride, and trimellitic anhydride. Other anhydrides useful in the invention include, without limitation, adipic anhydride, glutaric anhydride, malonic anhydride, and the like.

The reaction of the polycarboxylic acid or anhydride with the core polyol results in formation of a first intermediate that has carboxyl functionality and may contain some primary or secondary hydroxyl groups that result from any unreacted hydroxyl groups on the core polyol.

The stoichiometry is chosen so that at least one primary hydroxyl group of the core polyol reacts with the polycarboxylic acid or anhydride. Preferably at least two hydroxyl groups on the core polyol will be reacted. In some embodiments the molar ratio of hydroxyl on the core polyol to carboxyl group on the polycarboxylic acid or anhydride will be approximately 1:1, so that essentially every hydroxyl group on the core polyol is esterified.

The first intermediate, which contains at least one carboxyl group and optionally has primary or secondary hydroxyl groups as noted above, is next reacted with a compound containing an epoxide group to form a second intermediate having a chain extension based on an epoxide-containing compound.

A wide variety of epoxide containing compounds may be used in the practice of the present invention. Epoxides are well-known in the art, and may be characterized by the general formula:

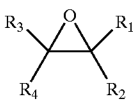

where $R_1$, $R_2$, $R_3$ and $R_4$ are each independently hydrogen (with the proviso that at least one of $R_1$–$R_4$ is other than hydrogen), an organic radical, which may be polymeric or non-polymeric and may contain unsaturation and/or heteroatoms, or one of $R_1$ or $R_2$ together with one of $R_3$ or $R_4$ may form a cyclic ring, which may contain unsaturation and/or heteroatoms.

Useful epoxides can be prepared from monofunctional alcohols, e.g., butanol and hexanol, by reaction with an epihalohydrin (e.g., epichlorohydrin) or by reaction of an allyl group with peroxide. For example, a monoepoxide can be prepared by reacting a mono-alcohol or mono-acid with an epihalohydrin or a monounsaturate with peroxide.

In one preferred embodiment, the epoxide is a monoepoxide preferably an epoxy ester, also known as a glycidyl ester. Glycidyl esters can be prepared by reacting a monofunctional carboxylic acid (e.g., octanoic acid, benzoic acid, benzylic acid, cyclohexane carboxylic acid) with an epihalohydrin (e.g., epichlorohydrin) under conditions well-known in the art. In a preferred embodiment, the monofunctional carboxylic used to produce the glycidyl esters is a branched neo-acid such as, without limitation, neodecanoic or neononanoic acid. Glycidyl esters are commercially available, e.g., as Cardura® E from Shell Oil Company, Glydexx® N-10 from Exxon, or Araldite® PT910 from Ciba-Geigy. Glycidyl esters may be described by the formula:

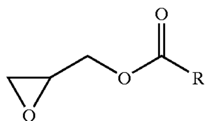

wherein R is a hydrocarbon group of from 1 to about 40 carbon atoms, preferably from about 1 to about 20 carbon atoms, and most preferably from about 1 to about 12 carbon atoms. This hydrocarbon group may be substituted, as is known in the art. In a preferred embodiment.

Another useful class of monoepoxides is glycidyl ethers. Glycidyl ethers can be prepared by the reaction of monofunctional alcohols (e.g., n-butanol, propanol, 2-ethylhexanol, dodecanol, phenol, cresol, cyclohexanol, benzyl alcohol) with an epihalohydrin (e.g., epichlorohydrin). Useful glycidyl ethers include the glycidyl ether of 2-ethylhexanol, the glycidyl ether of dodecanol, the glycidyl ether of phenol, and the like. These compounds are commercially available under the Erisys® product family from CVC Specialties.

The reaction of the epoxide compound with the first intermediate is preferably carried out without catalyst. In this case, the epoxide group of the epoxide-containing compound reacts faster with the carboxyl group than with any primary or secondary hydroxyl groups that may be present on the first intermediate. Therefore, a relatively clean chain extension is achieved to form a second intermediate that contains secondary hydroxyl groups resulting from ring opening of the epoxide, as well as any primary or secondary hydroxyl groups that remained unreacted in the formation of the first intermediate, above.

Preferably the epoxy containing compound is reacted in a molar ratio of about 1:1 with respect to carboxyl groups on the first intermediate. However, if carboxyl groups are desired in the final product (for example for salting with amines to provide a water dispersible coating), an excess of carboxyl functional first intermediate may be used.

The next step in preparing the resin of the invention is to add carbamate groups to the second intermediate. As discussed above, the second intermediate contains at least secondary hydroxyl groups resulting from the ring opening of the epoxy containing compound. It may also contain primary or secondary hydroxyl groups on the core, if less than a molecular equivalent of polycarboxylic compound was used to react with the core polyol.

Techniques for adding carbamate groups to the second intermediate are known in the art and are described, for example, in P. Adams and F. Barren "Esters of Carbamate Acid", Chemical Review, Vol. 65 (1965). For example, a carbamate group may be added to the second intermediate by reacting the second intermediate with phosgene and then ammonia to form a compound having primary carbamate groups, or by reaction of the second intermediate with phosgene and then a primary amine to form a compound having secondary carbamate groups. Alternatively, the second intermediate may be reacted with one or more ureas to form a compound with secondary carbamate groups (i.e., N-alkyl carbamates). This reaction is accomplished by heating a mixture of the second intermediate and urea. Another technique is the reaction of the second intermediate with a monoisocyanate, for example methylisocyanate, to form a compound with secondary carbamate groups.

The second intermediate can be reacted with a carbamate compound to form the carbamate-functional second intermediate. In one embodiment, the carbamate compound is cyanic acid, which may be formed by the well-known reaction of the thermal decomposition of urea or by other methods, such as described in the U.S. Pat. Nos. 4,389,386 or 4,364,913. In another embodiment, the carbamate compound is a compound comprising a carbamate group. In this embodiment, the reaction between the second intermediate and the carbamate compound is believed to be a transesterification between the hydroxyl groups on the second intermediate and the carbamate ester on the carbamate compound. The carbamate compound can be any compound having a carbamate group capable of undergoing a transesterification with the hydroxyl groups on the second intermediate. These include, without limitation, methyl carbamate, butyl carbamate, propyl carbamate, 2-ethylhexyl carbamate, cyclohexyl carbamate, phenyl carbamate, hydroxypropyl carbamate, hydroxyethyl carbamate, and the like. Useful carbamate compounds can be characterized by the formula:

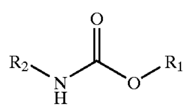

wherein $R_1$ is substituted or unsubstituted alkyl (preferably of 1–8 carbon atoms) and $R_2$ is H, substituted or unsubstituted alkyl (preferably of 1–8 carbon atoms, substituted or unsubstituted cycloalkyl (preferably of 6–10 carbon atoms), or substituted or unsubstituted aryl (preferably of 6–10 carbon atoms). Preferably, $R_2$ is H.

The transesterification reaction between the second intermediate and the carbamate compound can be conducted under typical transesterification conditions, e.g., temperatures from room temperature to 150° C. with transesterification catalysts such as calcium octoate, metal hydroxides (e.g., KOH), Group I or II metals (e.g., Na, Li), or metal carbonates (e.g., $K_2CO_3$). These may be enhanced by use in combination with crown ethers, metal oxides (e.g., dibutyltin oxide), metal alkoxides (e.g., $NaOCH_3$, $Al(OC_3H_7)_3$), metal carboxylic acid salts (e.g., stannous octoate, calcium octoate), protic acids (e.g., $H_2SO_4$), $MgCO_3$, or Ph4SbI. The reaction may also be conducted at room temperature with a polymer-supported catalyst such as Amberlyst-15® (Rohm & Haas) as described by R. Anand, *Synthetic Communications,* 24(19), 2743–47 (1994), the disclosure of which is incorporated herein by reference.

In another embodiment, the carbamate compound comprises a molecule with an isocyanate group and a carbamate group. Such a molecule can be prepared for example by reacting an organic diisocyanate with a difunctional compound that contains, in addition to a carbamate group, a reactive hydroxyl or amino group. The difunctional molecule can be, for example, a hydroxycarbamate that is the reaction product of ammonia or a primary amine with an alkylene carbonate, which is well known in the art.

Diisocyanates suitable for reaction with the difunctional compound to form the carbamate compound include aliphatic or cycloaliphatic diisocyanates, such as 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl) methane, hexamethylene diisocyanate (HMDI), 1,2-bis-(isocyanatomethyl)cyclobutane, 1,3- and 1,4-bis-(isocyanatomethyl)cyclohexane, hexahydro-2,4- and/or -2,6-diisocyanatotoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane.

Other suitable diisocyanates include aromatic diisocyanates, such as, without limitation, tetramethyl-1,3-and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanato naphthalene, p-xylylene diisocyanate and mixtures thereof.

Suitable diisocyanates are also understood to include those containing modification groups such as biuret, uretdione, isocyanurate, allophanate and/or carbodiimide groups, as long as they contain two isocyanate groups.

The carbamate compound can be prepared by converting one of the isocyanate groups of the diisocyanate to a carbamate group by reacting the diisocyanate with the difunctional compound. To make it easier to convert just one isocyanate group, it is preferred to use a diisocyanate compound that has isocyanate groups of different reactivity. In this situation, one of the isocyanates will react preferentially with the difunctional compound.

Examples of diisocyanates having isocyanate groups of different reactivity include, without limitation, 1-isocyanato-3-isocyanatomethyl-3,5,5-trimethylcyclohexane (also known as isophorone diisocyanate), 1-isocyanato-2-isocyanatomethylcyclopentane, 1-isocyanato-1-methyl-4(3)-isocyanatomethylcyclohexane, 2,3-toluenediisocyanate, and 2,4-toluenediisocyanate. In a preferred embodiment, isophorone diisocyanate is used.

The product of such a reaction is a compound with an isocyanate group and a carbamate group. As an illustration, when the diisocyanate is isophorone diisocyanate, and the difunctional molecule is a reaction product of ammonia and propylene carbonate, one isomer of the carbamate compound can be represented by the idealized structure

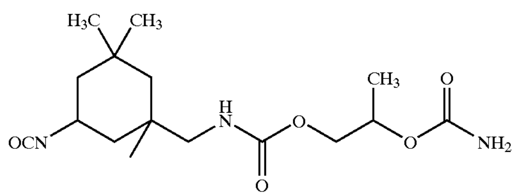

The idealized structure illustrates the preferential reaction of the difunctional compound with the primary isocyanate on isophorone diisocyanate. The actual product of such a reaction statistically will include some product substituted on the secondary isocyanate, as well as disubstitued diisocyanate and some unreacted diisocyanate. The product can then be reacted with the second intermediate to provide the resin of the invention.

The resin of the invention can contain carbamate groups on the core, on the second chain extension, or both. It follows from the discussion above that any carbamate groups on the core will be attached to primary or secondary hydroxyl carbamate groups, while any carbamate groups on the second chain extension will be attached to secondary hydroxyl groups.

In one embodiment, the presence of at least some free hydroxyl groups on the carbamate-functional resin is preferred to increase intercoat adhesion by allowing for hydrogen bonding. For example, all or a portion of the primary hydroxyl groups on the second intermediate may be selectively carbamoylated, leaving unsubstituted secondary hydroxyl groups on the resin of the invention. The reaction rate of a primary hydroxyl group with the carbamate compound is greater than that of a secondary hydroxyl group. Selective carbamoylation of the primary groups is straightforward because the carbamate compound reacts preferentially with the primary hydroxyl group.

On the other hand, in another embodiment, all of the available hydroxyl groups on the second intermediate are converted to carbamate groups. This is desirable when greater crosslinking density is desired in the resin.

In another embodiment, the carbamate-functional resin of the invention can be prepared by direct carbamoylation of the core polyol itself. The primary hydroxyl groups of the core may be converted to carbamate functionality by any of the techniques noted above. To make the resin soluble in organic solvents, it is preferred that at least one of the primary hydroxyl groups on the core polyol be converted by reaction with a second compound having an isocyanate group and a carbamate group. Such compounds are prepared from organic diisocyanates as discussed above. Preferably, most or all of the primary or secondary hydroxyl groups on the core polyol are reacted with the second molecule to form a highly carbamate-functional resin.

In a non-limiting example, a hyperbranched core polyol is made by reacting trimethylolpropane and dimethylol propionic acid in a 1:3 molar ratio such that there are equal equivalents of hydroxyl groups on the trimethylolpropane to carboxyl groups on the dimethylolpropionic acid. A core polyol results that has six primary hydroxyl groups. The core polyol is reacted with a carbamate-functional isocyanate molecule, which is in turn prepared by the reaction of isophorone diisocyanate with a hydroxy carbamate.

High solids coating compositions can be prepared by combining the carbamate-functional resin (A) of the invention with a compound (B) containing a plurality of functional groups that are reactive with the carbamate groups on the carbamate-functional resin. Such reactive groups include siloxane, silane, and anhydride groups, as well as active alkylol or alkoxyalkyl groups on aminoplast crosslinking agents or on other compounds such as phenol/formaldehyde adducts.

Examples of compounds (B) include, without limitation, melamine formaldehyde resin including monomeric or polymeric melamine resin and partially or fully alkylated melamine resin, urea resins (e.g., methylol ureas such as urea formaldehyde resin and alkoxy ureas such as butylated urea formaldehyde resin), N-methylol acrylamide emulsions, isobutoxy methacrylamide emulsions, polyanhydrides (e.g., polysuccinic anhydride), and siloxanes or silanes (e.g., dimethyldimethoxy silane). Aminoplast resins such as melamine formaldehyde resin or urea formaldehyde resin are especially preferred. Also useful are aminoplast resins where one or more of the amino nitrogens is substituted with a carbamate group for use in a process with a curing temperature below 150° C., as described in U.S. Pat. No. 5,300,328.

Aminoplast resins useful as compound B in the coating compositions of the invention can be highly alkylated or partially alkylated amino resins formed by the reaction of an amine with an aldehyde. Preferred amino resins include those which are reaction products of amines such as urea or melamine with an aldehyde such as formaldehyde. Such aminoplast resins are characterized by a degree of alkylation, degree of self crosslinking or a degree of polymerization, alkylol content, and imino content. Imino groups and amino groups on an aminoplast resin arise from the incomplete reaction of the aldehyde with the amine. Aminoplast resins are characterized as low-imino if the imino content is less than about 10%, that is, if less than about 10% of the functional groups on the resin consist of imino or amino groups. Commonly, low-imino aminoplast resins contain less than 5% imino content. On the other hand, if the imino content of an aminoplast resin is greater than about 10%, it can be characterized as high-imino. More commonly, the imino content of a high imino resin is 15% or higher. Commercial high imino melamine resins, for example, are available with up to about 35% imino content.

In another embodiment, the coating compositions of the invention can further comprise a carbamate-functional acrylic resin. Carbamate-functional resins are known in the art to be useful in clearcoat compositions. They include a plurality of carbamate functional groups on an acrylic backbone. The carbamate groups are introduced into the resin by transcarbamation of a hydroxyl-functional resin following polymerization of acrylic monomers, and can also be prepared from acrylic monomers containing carbamate functional groups. Such carbamate-functional acrylic resins are described, for example, in U.S. Pat. No. 5,605,965 to Rehfuss et al., the disclosure of which is hereby expressly incorporated by reference.

In this embodiment, the coating compositions of the invention comprise two carbamate-functional resins and at least one compound containing a plurality of functional groups reactive with the carbamate groups. The carbamate-functional acrylic resin, if present, makes up from between about 5 and about 95% by weight of the total carbamate resin in the composition.

A solvent may optionally be utilized in the coating composition used in the practice of the present invention. The coating composition according to the present invention can be applied without solvent. However, in many cases, it is desirable to use a solvent in the coating composition as well. This solvent should act as a solvent with respect to both the carbamate-functional resin or resins as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvent or polar aromatic solvent. Still more preferably, the solvent includes a ketone, ester, acetate, aprotic amide, aprotic sulfoxide, or aprotic amine. Examples of useful solvents include, without limitation, methyl ethyl ketone, methyl isobutyl ketone, amyl acetate, ethylene glycol butyl ether-acetate, propylene glycol monomethyl ether acetate, xylene, N-methylpyrrolidone, or blends of aromatic hydrocarbons. In another embodiment, the solvent can be water or a mixture of water with co-solvents.

The coating composition used in the practice of the invention may include a catalyst to enhance the cure reaction. For example, when aminoplast compounds, especially monomeric melamines, are used as component (B), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

Additional agents, for example surfactants, fillers, stabilizers, wetting agents, dispersing agents, adhesion promoters, UV absorbers, HALS, etc., may be incorporated into the coating composition. While the agents are well-known in the prior art, the amount used must be controlled to avoid adversely affecting the coating characteristics.

Coating compositions can be coated on the article by any of a number of techniques well-known in the art. These include, for example, spray coating, dip coating, roll coating, curtain coating, and the like. The coatings can be cured at about 200° F. to 350° F. for a period of about 10 to 60 minutes.

In one preferred embodiment, the coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80. In other preferred embodiments, the coating composition may be utilized to prepare high-gloss or low-gloss primer or enamel coatings.

When the coating composition according to the invention is used as the clearcoat of a composite color-plus-clear coating, the pigmented basecoat composition may be any of a number of types well-known in the art, and does not require explanation in detail herein. Polymers known in the art to be useful in basecoat compositions include acrylics, vinyls, polyurethances, polycarbonates, polysters, alkyds, and siloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable, functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functions groups.

Basecoat polymers may be self cross-linkable, or may require a separate cross-linking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional cross-linking agents.

The carbamate functional resins and coating compositions of the invention have been described above with respect to preferred embodiments. The following examples give further non-limiting descriptions of the use of the carbamate-functional resins in the coatings of the invention.

EXAMPLES

Resin Preparation 1A

In a first step, a hyperbranched polyol was prepared. 67 g of trimethylolpropane (TMP) and 201 g of dimethylolpropionic acid (DMPA) were combined in a 3-neck flask with 0.2 g of sulfuric acid as a catalyst and heated to reflux with stirring and with a stream of nitrogen. The course of the reaction was followed by removing the water liberated (27 g). Toward the end of the reaction, vacuum was applied to remove the final traces of water. The reaction was complete after 5 hours. The hydroxyl number was 690–710 mg KOH/g and the equivalent weight was 79–81 g/hydroxyl group. The acid number was less than 5 mg KOH/g.

In a separate flask, 102 g of propylene carbonate was heated with 80 g of 20% ammonia in methanol with stirring at 60–70° C. for 3 hours. Excess ammonium hydroxide was removed under vacuum with $N_2$ stripping. 115 g of dry hydroxypropyl carbamate (HPC) was produced. To this, 222 g of isophorone diisocyanate (IPDI) and 50 g of butyl acetate was added and heated at 80–100° C. The reaction was monitored by determining the isocyanate content left. At the end of 4 hours, the isocyanate content did not change over 30 minutes and was 10.5% (starting value 21.5%). The theoretical equivalent weight was 349 g/isocyanate/NV.

200 g of the reaction product of IPDI and HPC were added to 40 g of the hyperbranched polyol and stirred at 80–100° C. for 3 hours. At the end of the reaction, the isocyanate content was determined to be less than 0.1% and the product was a hexafunctional carbamate compound. Butyl acetate was added to produce a final percent non-volatiles of 70% by weight.

Resin Preparation 1B

A carbamate-functional resin was prepared as in resin preparation 1A, except that 100 g of the reaction product of IPDI and HPC were reacted with 40 g of the hyperbranced polyol. At the end of the reaction, isocyanate content was determined to be less than 0.1% and the product was a trifunctional carbamate.

Resin Preparation 2

Trimethylolpropane and dimethylolpropionic acid were reacted as in 1A to form a hyperbranched polyol. 240 g of the hyperbranched polyol were reacted with 231 g of exahydrophthalic anhydride (3 equivalents of hydroxyl to 1.5 equivalents of anhydride) in 50 g of Aromatic 100 solvent. An exotherm started at 130° C. and ended at 150° C. After 1 hour, infrared analysis showed no anhydride and the acid number was determined to be ca. 170–185 mg KOH/g NV. To this, 360 g of Cardura® E (1.5 equivalents) was added at 130° C. The temperature first increased to 150° C. and on cooling was maintained at 120° C. for 4 hours. IR showed no epoxide left. The measured weight per epoxide was greater than 5000 g/epoxide. The acid number was less than 0.1 mg KOH/g.

To this, 125 g of methylcarbamate was added along with 2 g of dibutyltin dioxide (DBTO) and 300 g of toluene. The reaction mixture was heated to 120–130° C. At 123° C., methanol byproduct of the transesterification started to azeotrope along with toluene. The reaction was monitored by titrating for the hydroxyl number. The starting hydroxyl number was 200 mg KOH/g/NV and the reaction was continued until the number dropped to about 18 mg KOH/g NV for a 90% conversion. Total time for the conversion was about 10 hours.

Resin Preparation 3A 136 g of pentaerythritol (99% pure grade, 1 mole) was heated with 616 g of hexahydrophthalic anhydride (4 moles) to 125° C. to form a first intermediate. An exotherm starts and peaks around 160° C. On returning back to 125° C. (1 hour), the acid number was determined to be 290–310 mg KOH/g. To this, 1000 g of Cardura® E was added (eq.wt 250 g/epoxide, 4 moles) to form a second intermediate. An exotherm peaks at 150° C. The reaction cooled back to 130° C. and reaction continued until the acid number was <3 mg KOH/g.

360 g of methylcarbamate, 4 g of DBTO, 900 g of toluene and 200 g of xylene were added to the second intermediate and heated to 120–130° C. At 123° C., methanol byproduct of the transesterification started to azeotrope along with toluene. The reaction was monitored by titrating for the hydroxyl number. The starting hydroxyl number was 128 mg KOH/g NV and the reaction was continued until the number dropped to about 13 mg KOH/g NV. The theoretical conversion was about 90%. The total time for the conversion was about 10 hours. Gel permeation chromatography analysis showed a molecular weight of 1900–2100 and a polydispersity of 1.1–1.2

Resin Preparation 3B 876 g of the second intermediate of Resin preparation 3A was reacted with 600 g of the reaction product of IPDI and HPC described in Resin preparation 1A (4 hydroxy equivalents to 3 isocyanate equivalents) in 600 g of amyl acetate to produce resin 3B at 70% by weight solids. The product was a tricarbamate-functional resin with one primary hydroxyl group.

Resin Preparation 4A 182 g of dulcitol and 616 g of HHPA are reacted by heating the mixture to 125° C. After an exotherm to 150° C., the acid number is 410–430 mg KOH g. To the reaction mixture, 1000 g of Cardura® E is added and the mixture is heated to 130° C. An exotherm occurs to 150° C. After 5 hours, the acid number is 3 mg KOH/g. The hydroxyl number is 180–200 mg KOH/g.

The Cardura® E reaction product is transesterified at 120–130° C. with 540 g of methylcarbamate, in the presence of 5 g of dibutyltin oxide, 700g toluene, and 300 g xylene.

The final hydroxyl number is less than 20 mg KOH/g NV, indicating a 90% conversion. The resin was a hexacarbamate with a polydispersity of 1.1–1.3.

Resin Preparation 4B

Preparation of the resin is carried out as in 4A, except that 360 g of methylcarbamate was used in the transesterfication step. The reaction product had four carbamate functional groups and two hydroxyls, with a polydispersity of 1.2–1.4.

In all Examples 1A–4A and 1B–4B, the carbamate-functional resins of the respective resin preparations were taken up into solvent with a melamine crosslinking resin. The solvent containing composition was drawn down as a film on a phosphated steel plate. The film was cured for 30 minutes at 260° F. The cured films of Examples 1A–4A and 1B–4B gave more than 200 MEK rubs.

The carbamate-functional resins of Resin Preparations 1A and 3A were formulated into clearcoat compositions as illustrated in Examples 5–8. To make the clearcoat compositions, the ingredients were added in the order specified in the Examples with agitation. Following addition, they were reduced to a spray viscosity of about 35 seconds in a No. 4 Ford viscosity cup at 80° F.

The clearcoat compositions of Examples 6–8 were applied with an air atomized spray gun, wet-on-wet, over a conventional black, medium solid solvent based basecoat. The basecoats were sprayed over a 4"×12" electrocoated steel panel. The basecoat film thickness was 0.7 mils, and the clearcoat film builds were from about 1.8 to about 2.0 mils. After application, the panels were allowed to flash at ambient temperature for 10 minutes, then baked in a gas fired convection oven for 25 minutes at 275° F. metal temperature.

Next the clearcoat compositions of Examples 6–8 were sprayed over a waterborne basecoat. The waterborne basecoats were sprayed over steel panels, and were allowed to flash at 140° F. for 5 minutes to remove water. The clearcoats were applied as above. The clearcoat basecoat was flashed at ambient temperature for 10 minutes and baked in a gas fired convection oven for 25 minutes at 275° F. metal temperature.

The following components are used the Examples:

| | |
|---|---|
| Carbamate functional resin | carbamate functional resin of the invention, prepared according to Preparation 1A or 3A as indicated in the first row |
| carbamate acrylic resin | carbamate functional acrylic polymer, equivalent weight 404, resin solids 68% by weight |
| melamine resin | butylated polymeric melamine formaldehyde resin, provided as a 61.6% solids solution. |
| Iso crosslinker | blocked polyisocyanate |
| UV absorber | triazine UV absorber from Ciba-Geigy |
| HALS | hindered amine light stabilizer from Clariant |
| surfactant 1 | surface control agent |
| surfactant 2 | silicone surfactant |
| DDBSA | a blocked dodecylbenzenesulfonic acid catalyst |
| Solvent 1 | Exxate 1000, a C10 alkyl acetate solvent from Exxon |
| Solvent 2 | Exxate 600, a C6 alkyl acetate solvent from Exxon |
| Spray Viscosity | Viscosity in a No. 4 Ford cup at 80° F. |

| | 5 | 6 | 7 | 8 |
|---|---|---|---|---|
| Resin of Preparation | — | 1A | 1A | 3A |
| Carbamate functional resin | — | 54.1 | 106.1 | 45.9 |
| Carbamate acrylic resin | 104.8 | 51.3 | — | 53.3 |
| Melamine resin | 29.1 | 25.2 | 21.1 | 27.1 |
| Iso crosslinker | 6.7 | 6.7 | 6.7 | 6.7 |
| UV absorber | 3.5 | 3.5 | 3.5 | 3.5 |
| HALS | 1.5 | 1.5 | 1.5 | 1.5 |
| Surfactant 1 | .25 | .25 | .25 | .25 |
| Surfactant 2 | .05 | .05 | .05 | .05 |
| DDBSA | 4.8 | 4.8 | 4.8 | 4.8 |
| Solvent 1 | 7.0 | 7.0 | 7.0 | 7.0 |
| Solvent 2 | 50.6 | 41.20 | 32.76 | 42.2 |
| Spray viscosity | 34 | 34 | 35 | 35 |
| Solids | 48 | 51.1 | 54.4 | 52 |

The invention has been described in detail with respect to preferred embodiments. It is to be understood, however, that variations and modifications may be made by persons of skill in the art based on the disclosure herein that are within the spirit and scope of the invention.

We claim:

1. A coating composition comprising a) a carbamate-functional resin comprising a hyperbranched or star polyol core;

a first chain extension based on a polycarboxylic acid or anhydride;

a second chain extension based on an epoxide-containing compound; and carbamate functional groups on the core, the second chain extension or both, and b) a crosslinking resin comprising a plurality of functional groups reactive with the carbamate groups on the carbamate-functional resin.

2. A coating composition according to claim 1, wherein the core comprises a hyperbranched polyol that is the reaction product of a diol or triol and a compound with one carboxyl group and two or more hydroxyl groups.

3. A coating composition according to claim 2, wherein the core comprises a hyperbranched polyol that is the reaction product of a triol and a compound with one carboxyl group and two hydroxyl groups.

4. A composition according to claim 1, wherein the carbamate-functional resin comprises a star polyol core, wherein the star polyol core comprises a monomeric polyol with three or more primary or secondary hydroxyl groups.

5. A composition according to claim 4, wherein the star polyol is selected from the group consisting of trimethylolpropane, trimethylolethane, glycerol, pentaerythritol, dipentaerythritol, ditrimethylolpropane, and mixtures thereof.

6. A coating composition according to claim 1, wherein the first extension is based on an anhydride of a cycloaliphatic dicarboxylic acid having carboxylic acid groups on adjacent carbon atoms.

7. A composition according to claim 1, wherein the first extension is selected from the group consisting of hexahydrophthalic anhydride, methylhexahydrophthalic anhydride, tetrahydropthalic anhydride, methyltetrahydropthalic anhydride, adipic anhydride, glutaric anhydride, and mixtures thereof.

8. A composition according to claim 1, where the epoxide-containing compound comprises a glycidyl ester of a $C_{2-40}$ carboxylic acid.

9. A composition according to claim 1, wherein the core comprises pentaerythritol, the anhydride comprises hexahydrophthalic anhydride, and the epoxide compound comprises a glycidyl ester of neodecanoic acid.

10. A composition according to claim 1, wherein the coating composition is a clearcoat composition.

11. A composition according to claim 1, wherein the crosslinking resin comprises an amino resin.

12. A composition according to claim 11, wherein the amino resin comprises a melamine formaldehyde resin.

13. A composition according to claim 11, wherein the amino resin has an imino content of 10% or greater.

14. A composition according to claim 1, further comprising a carbamate-functional acrylic resin.

15. A composition according to claim 14, wherein the crosslinking resin comprises an amino resin having 10% or higher imino content.

16. A carbamate functional resin, made by a process comprising the steps of:

reacting a core compound having three or more primary or secondary hydroxyl groups with a carboxylic anhydride to form a first intermediate containing at least one carboxylic functional group and optionally containing primary hydroxyl groups;

reacting the first intermediate with a compound containing one epoxide group to form a second intermediate containing at least one secondary hydroxyl group; and reacting the second intermediate with a carbamic compound to convert some or all of the secondary and optional primary hydroxyl groups to a carbamate functional group.

17. A resin according to claim 16, wherein the core compound comprises a star polyol selected from the group consisting of trimethylolpropane, trimethylolethane, glycerol, pentaerythritol, ditrimethylolpropane, dipentaerythritol, and mixtures thereof.

18. A resin according to claim 16, wherein the core compound comprises the reaction product of a) a first compound having two or more hydroxyl groups; and b) a second compound having one carboxyl group and two or more hydroxyl groups.

19. A resin according to claim 18, wherein the polydispersity of the reaction product is greater than 1.0.

20. A resin according to claim 16, wherein the first intermediate has at least one hydroxyl group.

21. A resin according to claim 16, wherein the carbamate-functional resin contains secondary hydroxyl groups.

22. A resin according to claim 16, wherein the carbamate-functional resin contains primary and secondary hydroxyl groups.

23. A coating composition comprising a carbamate-functional resin A according to claim 16, and a compound B comprising a plurality of functional groups reactive with the carbamate groups of the carbamate-functional resin.

24. A composition according to claim 23, wherein the compound B comprises an amino resin.

25. A composition according to claim 24, wherein the compound B comprises a melamine formaldehyde resin.

26. A composition according to claim 24, wherein the amino resin has an imino content greater than 10%.

27. A method for producing a composite coating on a substrate comprising the steps of applying a basecoat composition to the substrate;

applying a clearcoat comprising a composition according to claim 23 onto the basecoat; and baking the basecoat and topcoat together to cure the composite coating.

28. A method according to claim 27, wherein the basecoat composition is a waterborne composition.

29. A carbamate-functional resin, comprising the reaction product of a) a core compound having three or more primary hydroxyl groups; and b) a second compound having an isocyanate group and a carbamate group.

30. A resin according to claim 29, wherein the second compound comprises the reaction product of an organic diisocyanate and a difunctional compound having a hydroxyl and a carbamate group.

31. A resin according to claim 30, wherein the difunctional compound comprises the reaction product of ammonia or a primary amine with an alkylene carbonate.

32. A resin according to claim 29, wherein the second compound and the core compound are reacted in about a one-to-one ratio of isocyanate groups to hydroxyl groups.

33. A resin according to claim 29, wherein the resin contains primary hydroxyl groups.

34. A resin according to claim 29, wherein the core compound comprises the reaction product of 1) a first compound having two or more hydroxyl groups; and 2) a second compound having one carboxyl and two or more hydroxyl groups.

35. A resin according to claim 34, wherein the first compound has three hydroxyl groups and the second compound has one carboxyl group and two hydroxyl groups.

36. A coating composition comprising a carbamate-functional resin according to claim 29; and a second resin having a plurality of functional groups reactive with the carbamate groups on the carbamate-functional resin.

37. A coating composition according to claim 36, wherein the second resin comprises an amino resin.

38. A coating composition according to claim 37, wherein the amino resin comprises a melamine formaldehyde resin with an imino content of 10% or greater.

39. A composite coating comprising a) basecoat comprising a cured organic coating; and b) a topcoat applied to the basecoat, comprising a coating composition according to claim 36.

40. A composite coating according to claim 39, wherein the basecoat is a waterborne basecoat.

41. A carbamate-functional resin comprising a hyperbranched or star polyol core;

a first chain extension based on a polycarboxylic acid or anhydride;

a second chain extension based on an epoxide-containing compound; and carbamate functional groups on the core, the second chain extension or both.

42. A resin according to claim 41, wherein the core comprises a hyperbranched polyol that is the reaction product of a diol or triol and a compound with one carboxyl group and two or more hydroxyl groups.

43. A resin according to claim 42, wherein the core comprises a hyperbranched polyol that is the reaction product of a triol and a compound with one carboxyl group and two hydroxyl groups.

44. A resin according to claim 41, wherein the carbamate-functional resin comprises a star polyol core, wherein the star polyol core comprises a monomeric polyol with three or more primary or secondary hydroxyl groups.

45. A resin according to claim 44, wherein the star polyol is selected from the group consisting of trimethylolpropane, trimethylolethane, glycerol, pentaerythritol, dipentaerythritol, ditrimethylolpropane, and mixtures thereof.

46. A resin according to claim 41, wherein the first extension is based on an anhydride of a cycloaliphatic dicarboxylic acid having carboxylic acid groups on adjacent carbon atoms.

47. A resin according to claim 41, wherein the first extension is selected from the group consisting of hexahydrophthalic anhydride, methylhexahydrophthalic anhydride, tetrahydropthalic anhydride, methyltetrahydropthalic anhydride, adipic anhydride, glutaric anhydride, and mixtures thereof.

48. A resin according to claim 41, where the epoxide-containing compound comprises a glycidyl ester of a $C_{2-40}$ carboxylic acid.

49. A resin according to claim 41, wherein the core comprises pentaerythritol, the anhydride comprises hexahydrophthalic anhydride, and the epoxide compound comprises a glycidyl ester of neodecanoic acid.

* * * * *